(12) United States Patent
Wang et al.

(10) Patent No.: US 12,106,052 B2
(45) Date of Patent: Oct. 1, 2024

(54) METHOD AND APPARATUS FOR GENERATING SEMANTIC REPRESENTATION MODEL, AND STORAGE MEDIUM

(71) Applicant: BEIJING BAIDU NETCOM SCIENCE AND TECHNOLOGY CO., LTD., Beijing (CN)

(72) Inventors: Shuohuan Wang, Beijing (CN); Siyu Ding, Beijing (CN); Yu Sun, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 868 days.

(21) Appl. No.: 17/205,894

(22) Filed: Mar. 18, 2021

(65) Prior Publication Data

US 2021/0248484 A1 Aug. 12, 2021

(30) Foreign Application Priority Data

Jun. 22, 2020 (CN) .......................... 202010574268.1

(51) Int. Cl.
*G06N 5/02* (2023.01)
*G06F 18/21* (2023.01)
*G06F 40/279* (2020.01)
*G06F 40/30* (2020.01)

(52) U.S. Cl.
CPC .......... *G06F 40/30* (2020.01); *G06F 18/2163* (2023.01); *G06F 40/279* (2020.01); *G06N 5/02* (2013.01)

(58) Field of Classification Search
CPC ...... G06F 18/2163; G06F 40/279; G06N 5/02
See application file for complete search history.

(56) References Cited

U.S. PATENT DOCUMENTS

2018/0068371 A1  3/2018  Krishnamurthy et al.

FOREIGN PATENT DOCUMENTS

CN  110717339 A  1/2020

OTHER PUBLICATIONS

Sun et al.("ERNIE 2.0: A Continual Pre-Training Framework for Language Understanding" Jul. 2019) (Year: 2019).*
Wang et al.("Ernie: Enhanced representation through knowledge integration" 2019) (Year: 2019).*
(Continued)

*Primary Examiner* — Lut Wong
(74) *Attorney, Agent, or Firm* — Lippes Mathias LLP

(57) ABSTRACT

The disclosure discloses a method and an apparatus for generating a semantic representation model, and a storage medium. The detailed implementation includes: performing recognition and segmentation on the original text included in an original text set to obtain knowledge units and non-knowledge units in the original text; performing knowledge unit-level disorder processing on the knowledge units and the non-knowledge units in the original text to obtain a disorder text; generating a training text set based on the character attribute of each character in the disorder text; and training an initial semantic representation model by employing the training text set to generate the semantic representation model.

11 Claims, 6 Drawing Sheets

(56) References Cited

OTHER PUBLICATIONS

Song et al.("MPNet: Masked and Permuted Pre-training for Language Understanding" Apr. 2020) (Year: 2020).*
Office Action for Japanese Application No. 2021-102856, dated Sep. 6, 2022, 4 pages.
Extended European Search Report for Application No. 21163169.2, dated Sep. 9, 2021, 10 pages.
Trevor Cohen et al., "Bringing Order to Neural Word Embeddings with Embeddings Augmented by Random Permutations (EARP)", Proceedings of the 22nd Conference Computational Natural Language Learning, Nov. 1, 2018, 11 pages.
Yu Sun et al., "ERNIE: Enhanced Representation through Knowledge Integration", April 19, 2019, 8 pages
Yu Sun el al., "ERNIE 2.0: Continual Pre-Training Framework for Language Understanding", Nov. 21, 2019, 8 pages.
Magnus Sahlgren et al., "Permutations as a Means to Encode Order in Word Space", Jan. 1, 2008, 6 pages.

* cited by examiner

METHOD AND APPARATUS FOR GENERATING SEMANTIC REPRESENTATION MODEL, AND STORAGE MEDIUM

CROSS-REFERENCE TO RELATED APPLICATION

The present application is based upon and claims priority to Chinese Patent Application No. 202010574268.1, filed on Jun. 22, 2020, the entirety contents of which are incorporated herein by reference.

FIELD

The disclosure relates to a field of artificial intelligence technologies and particularly to a field of natural language processing and deep learning technologies, and particularly relates to a method and an apparatus for generating a semantic representation model, an electronic device, and a storage medium.

BACKGROUND

Presently, NLP (natural language processing) is an important research direction in a field of artificial intelligence. In the related art, semantic analysis is performed for the NLP mainly by an XLNet (permutation language model). The XLNet takes a word as a unit, and an order of words are disorganized for performing modeling and the semantic analysis.

However, in the above technology, the XLNet taking the word as the unit may not model a complete word and a complete entity, and the model effect is limited.

SUMMARY

A method and an apparatus for generating a semantic representation model, and a storage medium are provided.

Embodiments of the disclosure provide a method for generating a semantic representation model. The method includes: obtaining an original text set including original texts; performing recognition and segmentation on the original text to obtain knowledge units and non-knowledge units in the original text; performing knowledge unit-level disorder processing on the knowledge units and the non-knowledge units in the original text to obtain a disorder text; generating a character attribute of each character in the disorder text, the character attribute comprising an original position of the character in the original text and a present position of the character; generating a training text set based on the character attribute of each character in the disorder text; and training an initial semantic representation model by employing the training text set to generate the semantic representation model.

Embodiments of the disclosure provide an apparatus for generating a semantic representation model. The apparatus includes: one or more processors; a memory storing instructions executable by the one or more processors; in which the one or more processors are configured to: obtain an original text set including original texts; perform recognition and segmentation on the original text to obtain knowledge units and non-knowledge units in the original text; perform knowledge unit-level disorder processing on the knowledge units and the non-knowledge units in the original text to obtain a disorder text; generate a character attribute of each character in the disorder text, in which the character attribute includes an original position of the character in the original text and a present position of the character; generate a training text set based on the character attribute of each character in the disorder text; and train an initial semantic representation model by employing the training text set to generate the semantic representation model.

Embodiments of the disclosure provides a non-transitory computer readable storage medium having computer instructions stored thereon. The computer instructions are configured to cause a computer to execute a method for generating the semantic representation model. The method includes: obtaining an original text set including original texts; performing recognition and segmentation on the original text to obtain knowledge units and non-knowledge units in the original text; performing knowledge unit-level disorder processing on the knowledge units and the non-knowledge units in the original text to obtain a disorder text; generating a character attribute of each character in the disorder text, the character attribute comprising an original position of the character in the original text and a present position of the character; generating a training text set based on the character attribute of each character in the disorder text; and training an initial semantic representation model by employing the training text set to generate the semantic representation model.

It should be understood that, the contents described in the Summary are not intended to identify key or important features of embodiments of the disclosure, nor is it intended to limit the scope of the disclosure. Other features of the disclosure will become apparent from the following description.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Description will be made below to a method and an apparatus for generating a semantic representation model, an electronic device, and a storage medium according to embodiments of the disclosure with reference to accompanying drawings.

Figure 1:
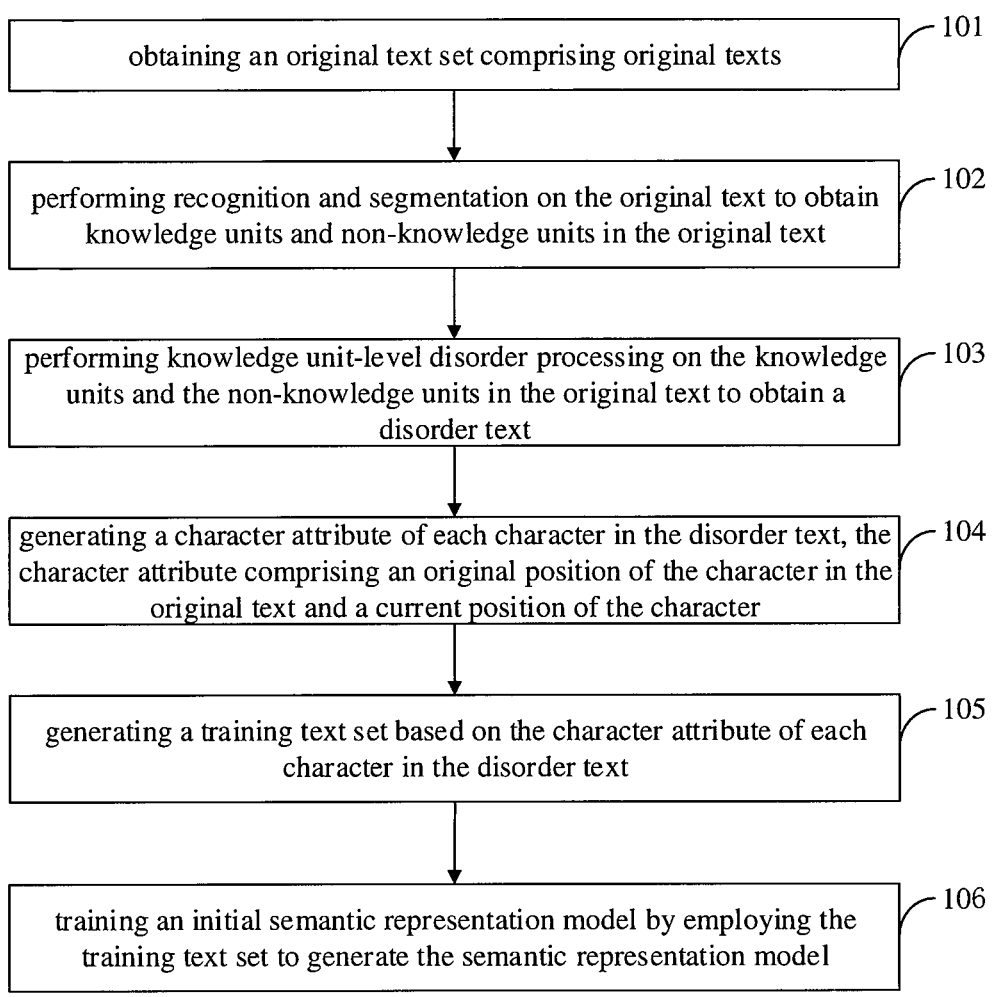
FIG. 1 is a flow chart according to Embodiment one of the disclosure.

FIG. 1 is a flow chart according to Embodiment one of the disclosure. It should be noted that, an executive subject of embodiments of the disclosure is an apparatus for generating a semantic representation model. The apparatus for generating the semantic representation model may be a hardware device or software in the hardware device.

As illustrated in FIG. 1, the method for generating the semantic representation model includes the following.

At block 101, an original text set is obtained. The original text set includes original texts.

In embodiments of the disclosure, the semantic representation model may preset multiple original texts, and the multiple original texts are combined into the original text set. The original text may include, but be not limited to, a sentence, a phrase, and a word. For example, the original text may be "table tennis", "Riverside Scene at Qingming Festival", and "哈尔滨是黑龙江的省会, 国际冰雪文化名城, 被誉为欧亚大陆桥的明珠(Chinese characters, which mean that, Harbin is the provincial capital of Heilongjiang Province and an international famous city of ice and snow culture, and is known as the pearl of the Eurasia land bridge)".

At block 102, recognition and segmentation are performed on the original text to obtain knowledge units and non-knowledge units in the original text.

In order to implement hierarchical modeling for a text, in some embodiments, first-level recognition and segmentation are performed on the original text to obtain first-level knowledge units and first-level non-knowledge units, and second-level recognition and segmentation are performed to obtain second-level knowledge units and second-level non-knowledge units. It should be noted that, the first level may be a sentence level, and the second level may be a word level.

In other words, since the original text may include, but be not limited to, the sentences and the words, different segmentation methods may be employed based on different types of the original texts in embodiments of the disclosure. As an example, when the original text includes multiple sentences, the multiple sentences in the original text may be recognized and segmented, and the original text may be segmented into the multiple sentences. Then, each sentence is recognized and segmented, and the sentence is segmented into multiple words and connectives between the multiple words. It should be noted that, the word may include a named entity.

For example, the original text "哈尔滨是黑龙江的省会, 国际冰雪文化名城, 被誉为欧亚大陆桥的明珠(Chinese characters, which mean that "Harbin is the capital of Heilongjiang, an international famous city of ice and snow culture, known as the of the Eurasia land bridge" in English, represented in Pinyin as "ha er bin shi hei long jiang de sheng hui, guo ji bing xue wen hua ming cheng, bei yu wei ou ya da lu qiao de ming zhu")" is taken as an example. The original text may be segmented into three sentences, which are "哈尔滨是黑龙江的省会(Chinese characters, which mean that "Harbin is the capital of Heilongjiang", represented in Pinyin as "ha er bin shi hei long jiang de sheng hui")", "国际冰雪文化名城(Chinese characters, which mean that "an international famous city of ice and snow culture", represented in Pinyin as "guo ji bing xue wen hua ming cheng")", and "被誉为欧亚大陆桥的明珠(Chinese characters, which mean that "known as the of the Eurasia land bridge", represented in Pinyin as "bei yu wei ou ya da lu qiao de ming zhu")". Then, the three sentences which are "哈尔滨是黑龙江的省会", "国际冰雪文化名城", and "被誉为欧亚大陆桥的明珠" are respectively recognized and segmented to recognize the words and the named entities. For example, the sentence "哈尔滨是黑龙江的省会" may be segmented into words "省会(Chinese characters, which mean a provincial capital in China)", "哈尔滨(Chinese characters, which mean a place name called Harbin), and "黑龙江(Chinese characters, which mean a province in China named as Heilongjiang)", and connectives "是(a Chinese character, which means "is")" and "的(a Chinese character, which means "of")", and the named entities may be recognized as "哈尔滨(Harbin)" and "黑龙江(Heilongjiang)" by recognizing the named entities of the segmented words.

As another example, when the original text includes a sentence, the recognition and the segmentation may be performed on words of the original text, and the sentence may be segmented into multiple words and connectives between the words.

As another example, when the original text includes one or more phrases, the recognition and the segmentation may be performed on each phrase in the original text to obtain words. For example, an original text is "tomorrow will be better". The original text may be segmented into words "tomorrow" and "better", and connectives "will be" after words and named entities are recognized and segmented from the original text.

At block 103, knowledge unit-level disorder processing is performed on the knowledge units and the non-knowledge units in the original text to obtain a disorder text.

In order to enable the model to predict a whole text, strengthen knowledge modeling and a long-distance dependence of the model, the disorder processing is performed in a hierarchical way instead of directly performing disorder processing in a unit of a word. In embodiments of the disclosure, an order of the knowledge units and the non-knowledge units in the original text may be disturbed to obtain the disorder text.

In order to further implement the hierarchical modeling for the text, the knowledge unit-level disorder processing is performed on the knowledge units and the non-knowledge units in the original text to obtain the disorder text, and then disorder processing may be performed on characters included in the knowledge units.

At block 104, a character attribute of each character in the disorder text is generated. The character attribute includes an original position of the character in the original text and a present position of the character.

As an example, each character in the original text may be labeled with a first position label in an order from 0 to N(N is greater than 0) before the knowledge unit-level disorder processing is performed on the knowledge units and the non-knowledge units in the original text. A character position recorded by the first position label is an original position of the character in the original text. After the knowledge unit-level disorder processing is performed the knowledge units and the non-knowledge units in the original text, and character-level disorder processing is performed on multiple characters included in the knowledge unit, each character in the disorder text is labeled with a second position label in an order from 0 to N (N is greater than 0), and a character position recorded by the second position label is a present position of the character.

At block 105, a training text set is generated based on the character attribute of each character in the disorder text.

At block 106, an initial semantic representation model is trained by employing the training text set to generate the semantic representation model.

In order to eliminate a deviation between pre-training and fine-tuning of the model, a one-way modeling method be determined based on the character attribute in embodiments of the disclosure. In addition, a deep learning way performs better on large data sets than other machine learning way. Therefore, in embodiments of the disclosure, an initial semantic representation model may be trained in the deep learning way to generate the semantic representation model. It should be noted that, the initial semantic representation model may be an AutoRegressive model (AR model for short).

As an example, the character in each position in front of the present position of the present character may be determined based on the character attributes of characters in the disorder text, to obtain a prediction result of the present character. A coefficient of the semantic representation model may be adjusted based on the present character and the prediction result of the present character, thereby generating the semantic representation model. See detailed description of following embodiments.

In order to enable the skilled in the art to understand the disclosure more clearly, an example may be given for illustration.

Figure 2:
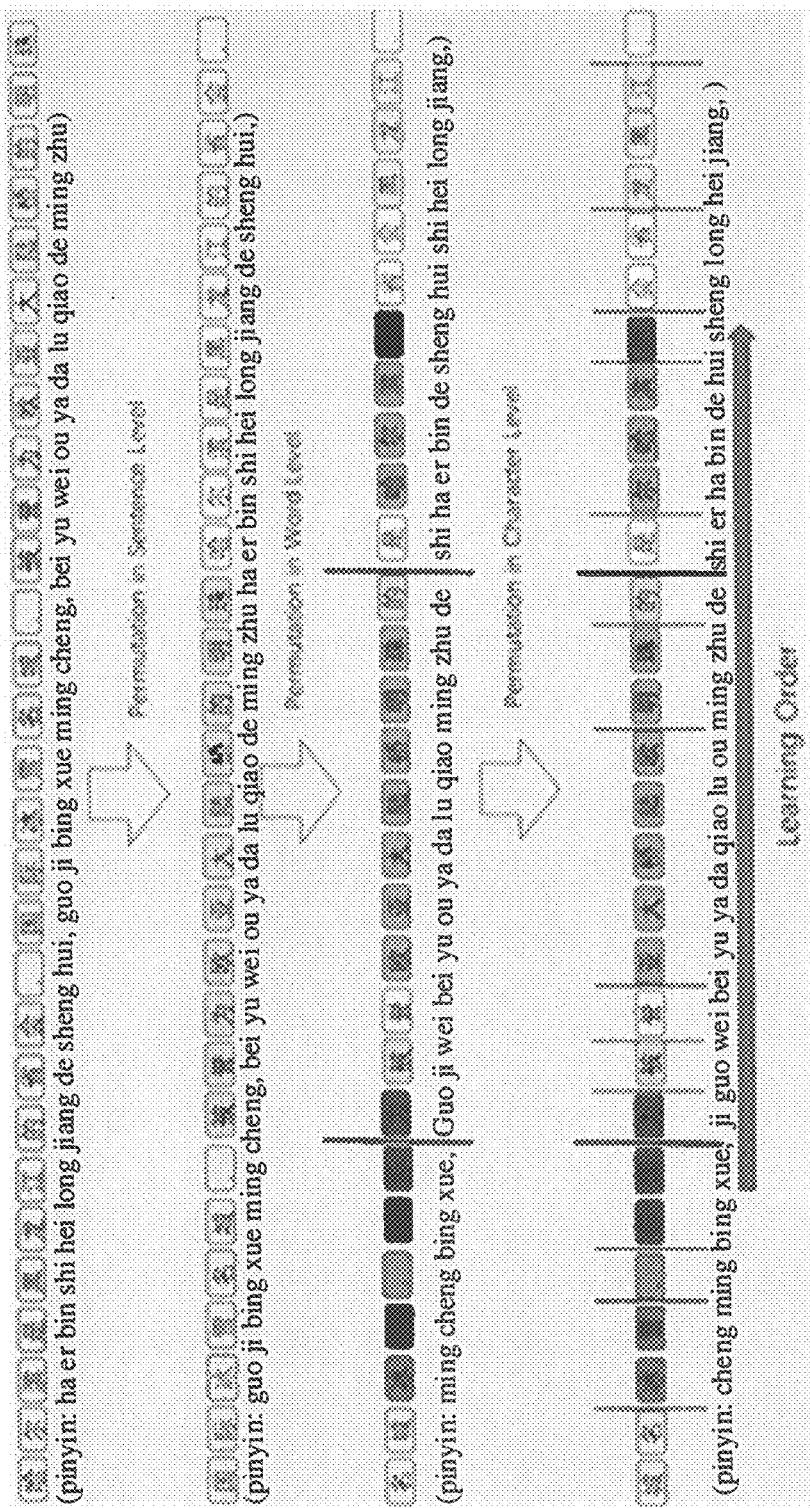
FIG. 2 is a schematic diagram illustrating hierarchical disorder modeling and training for a semantic representation model according to embodiments of the disclosure.

For example, as illustrated in FIG. 2, the original text " 哈尔滨是黑龙江的省会，国际冰雪文 化名城，被誉为欧亚大陆桥的明珠" is taken as an example. The original text may be segmented into three sentences, which are " 哈尔滨是黑龙江的省会", "国际冰雪文化名城", and " 被誉为欧 亚大陆桥的明珠". The disorder processing is performed on the three sentences. Then, each sentence is recognized and segmented to obtain words, and the disorder processing is performed on the segmented words in each sentence. Finally, the words in each sentence are segmented to obtain characters, and the disorder processing is performed on the characters in each word. After the disorder processing is completed, a left-to-right attention mechanism is employed to predict each word in turn, that is, an idea of an ERNIE (knowledge masking Bi-direction language model) is introduced into an AutoRegressive model. In this way, a complete word and a complete entity may be modeled based on the hierarchical disorder modeling method employed in the disorder text, such that the model may learn the knowledge of the real world, and the effect of the model is enhanced. Meanwhile, the one-way modeling method determined based on the character attributes eliminates the deviation between pre-training and fine-tuning.

In conclusion, the recognition and the segmentation are performed on the original text. The disorder processing is performed on the segmented original text to obtain the disorder text. The initial semantic model is trained based on the character attributes in the disorder text. In this way, by employing the hierarchical disorder modeling method for the knowledge units, the words and the entities in the original text may be modeled, such that the model may learn the knowledge of the real world, and the effect of the model is enhanced. Meanwhile, the one-way modeling method determined based on the character attributes eliminates the deviation between pre-training and fine-tuning.

Figure 3:
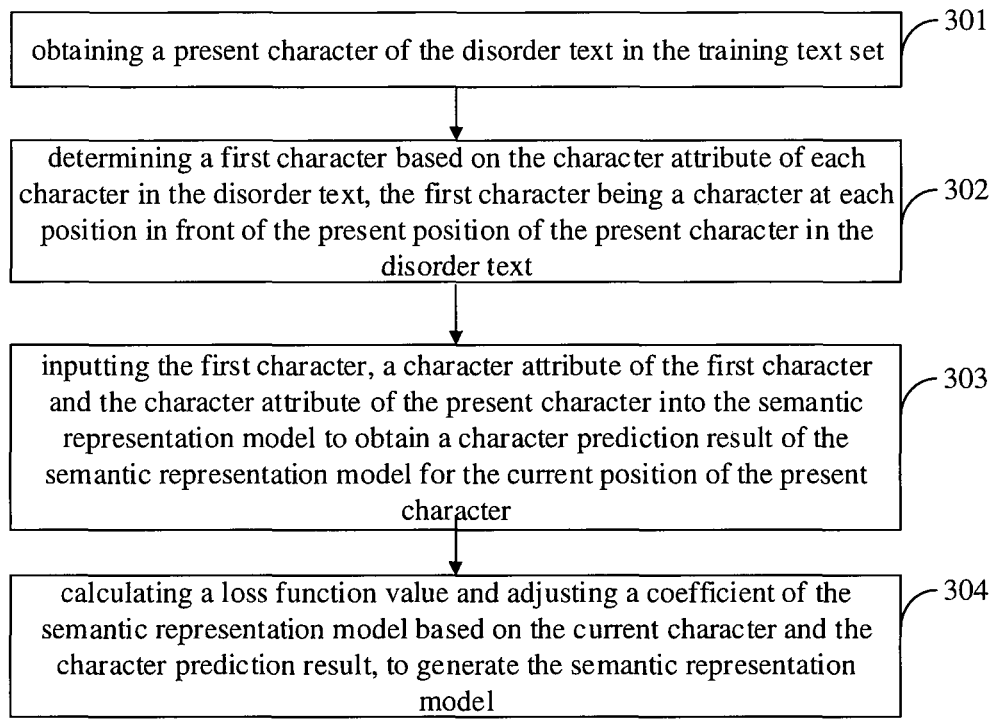
FIG. 3 is a flow chart according to Embodiment two of the disclosure.

In order to eliminate the deviation between the pre-training and the fine-tuning of the model, in embodiments of the disclosure, as illustrated in FIG. 3, FIG. 3 is a flow chart according to Embodiment two of the disclosure. The one-way modeling method may be determined based on the character attributes, and the initial semantic representation model may be trained in the deep learning way. The action at block 106 according to the embodiment illustrated in FIG. 1 may also include the following.

At block 301, a present character of the disorder text in the training text set is obtained.

As an example, each character of the disorder text is taken as the present character of the disorder text in turn from left to right by employing a left-to-right attention mechanism.

At block 302, a first character is determined based on the character attribute of each character in the disorder text. The first character is a character at each position in front of the present position of the present character in the disorder text.

In embodiments of the disclosure, the position of the present character in the disorder text may be determined based on a character position label in the disorder text, and the character in each position in front of the position of the present character in the disorder text is taken as the first character. For example, the disorder text is " 是尔哈滨的会省龙黑江(disordered Chinese characters, represented in Pinyin as "shi er ha bin de hui sheng long hei jiang")". When the present character is " 龙(long)", the first character is " 是(shi)", " 尔(er)", " 哈(ha)", " 滨(bin)", " 的(de)", " 会(hui)", and " 省(sheng)".

At block 303, the first character, a character attribute of the first character and the character attribute of the present character are inputted into the semantic representation model to obtain a character prediction result of the semantic representation model for the present position of the present character.

As an example, the first character, the character attribute of the first character and the character attribute of the present character are inputted into the semantic representation model. The semantic representation model may be configured to predict the character prediction result for the present position of the present character based on the first character, the character attribute of the first character and the character attribute of the present character. The character attribute of the first character is the position of each character of the first character in the disorder text and the original position of each character of the first character in the original text.

For example, the disorder text is " 是尔哈滨的会省龙黑江(disordered Chinese characters, represented in Pinyin as "shi er ha bin de hui sheng long hei jiang")". When the present character is " 龙(long)", the first character is " 是(shi)", " 尔(er)", " 哈(ha)", " 滨(bin)", " 的(de)", " 会(hui)", and " 省(sheng)". The first character, the character attribute of the first character and the character attribute of the present character may be inputted into the semantic representation model. The semantic representation model may be configured to predict the character prediction result for the present position of the present character.

It should be noted that, when the present position of the present character in the disorder text is 0, that is, the present character in the disorder is located at the first place, and the first character corresponding to the present character is empty, the semantic representation model may predict the character at the present position by employing a random model.

At block 304, a loss function value is calculated, and a coefficient of the semantic representation model is adjusted based on the present character and the character prediction result, to generate the semantic representation model.

In embodiments of the disclosure, the present character may be compared with the character prediction result, and a difference between the present character and the character prediction result may be regarded as a loss function. A loss function value is minimized by adjusting the coefficient of the initial semantic representation model, and the initial semantic representation model with a minimum loss function value is taken as the semantic representation model. In other words, when the loss function value is minimum, the character prediction result of the present character is closest to the present character, and the initial semantic representation model corresponding to the minimum loss function value may be taken as the semantic representation model.

In conclusion, the one-way modeling method is determined based on the character attributes in the disorder text, and the initial semantic representation model is trained in the deep learning way, thereby eliminating the deviation between pre-training and fine-tuning.

Figure 4:
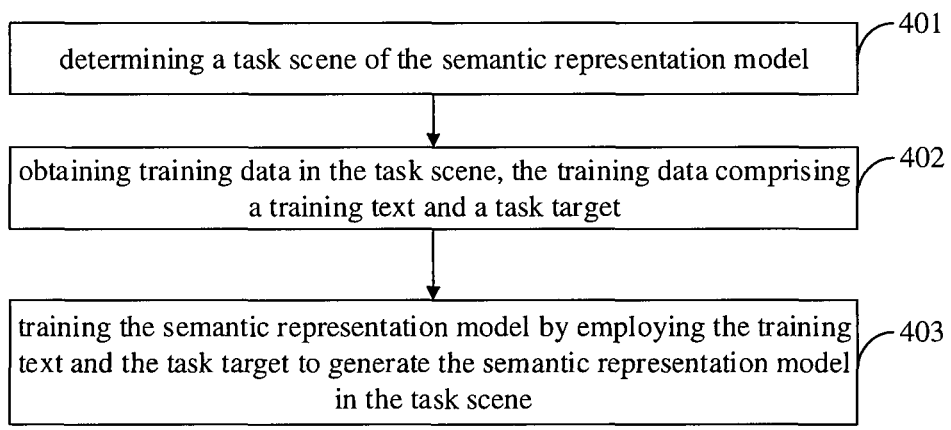
FIG. 4 is a flow chart according to Embodiment three of the disclosure.

In order to improve the usability and feasibility of embodiments of the disclosure, in embodiments of the disclosure, as illustrated in FIG. 4. FIG. 4 is a flow chart according to Embodiment three of the disclosure. After the initial semantic representation model is trained by employing the training text set to generate the semantic representation model, the semantic representation model may be trained to generate the semantic representation model in the task scene, such that the semantic representation model in the task scene may complete the analysis and prediction of the task scene. After the action at block 106 according to the embodiment illustrated in FIG. 1, the method may also include the following.

At block 401, a task scene of the semantic representation model is determined.

In embodiments of the disclosure, the task scene may include, but be not limited to, text similarity prediction, intelligent question answering, emotion analysis, natural language inference, and the like in a field of natural language processing technologies, and any one of the task scene may be regarded as the task scene of the semantic representation model.

At block 402, training data in the task scene is obtained. The training data includes a training text and a task target.

In embodiments of the disclosure, the training text in the training data may be a small amount of annotation data related a task, and the task target corresponding to the training text is an annotation result of the small amount of annotation data related to the task.

For example, the task scene is the emotion analysis is taken as an example. The task target is to determine a positive score and a negative score of an emotion, or a positive probability and a negative probability of the emotion. The small amount of annotation data related to the emotion analysis may be "good taste", "low cost performance", "clean environment, recommended", etc. The training data may be the "good taste", a corresponding task target is positive emotion with a positive emotion probability 90% and a negative emotion probability 10%. The training data may be the "low cost performance", and a corresponding task target is a negative emotion with a negative emotion probability 90% and a positive emotion probability 10%. The training data may be the "clean environment, recommended", a corresponding task target is a positive emotion with a positive emotion probability 95% and a negative emotion probability 5%.

At block 403, the semantic representation model is trained by employing the training text and the task target to generate the semantic representation model in the task scene.

As an example, the training text in the training data may be used as an input of the semantic representation model, and the corresponding task target may be used as the output of the semantic representation model, thereby implementing training the semantic representation model and generating the semantic representation model in the task scene.

In order to enable the skilled in the art to more clearly understand the disclosure, an example may be given.

Figure 5:
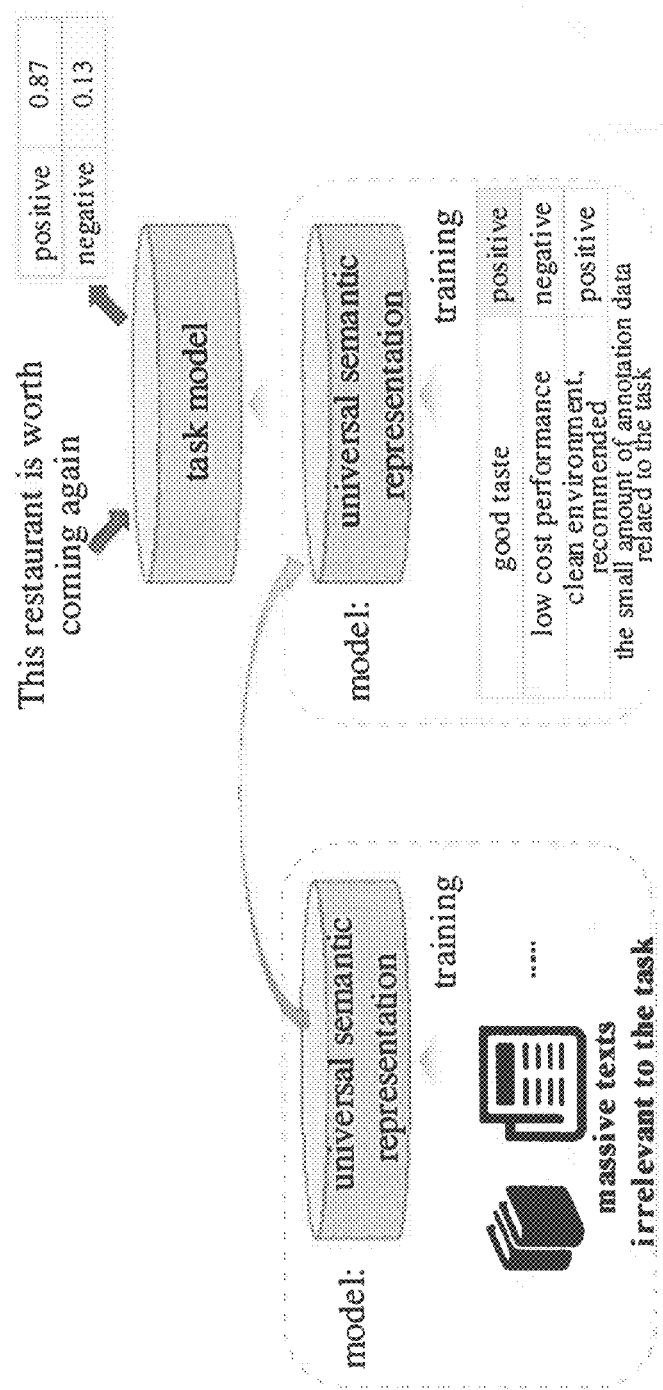
FIG. 5 is a schematic diagram illustrating a method for generating a semantic representation model in a task scene according to embodiments of the disclosure.

For example, as illustrated in FIG. 5, FIG. 5 is a schematic diagram illustrating a method for generating a semantic representation model in a task scene according to embodiments of the disclosure. A universal semantic representation may represent the semantic representation model. The task scene is the emotion analysis is taken as an example. The semantic representation model may be obtained by training the initial semantic representation model with massive texts irrelevant to the task. The semantic representation model may be obtained by training the semantic representation model with the small amount of annotation data related to the task. A corresponding task target may be obtained by inputting a text into the semantic representation model in the task scene. For example, a text "This restaurant is worth coming again" is inputted into the semantic representation model in the task scene, and it may be obtained that a corresponding positive probability of the emotion is 87%, and a negative probability of the emotion is 13%. In this way, it may be concluded that the semantic representation model is generated after training the initial semantic representation model by the massive texts, and then the semantic representation model in the task scene may complete the analysis and prediction of the task scene after training the semantic representation model with the training data in the task scene.

In conclusion, the task scene of the semantic representation model is determined, the training data in the task scene is obtained, and the semantic representation model is trained by employing the training data to generate the semantic representation model in the task scene, such that the semantic representation model in the task scene may complete the analysis and prediction of the task scene.

With the method for generating the semantic representation model according to embodiments of the disclosure, the original text set is obtained. The original text set includes the original texts. The recognition and the segmentation are performed on the original text to obtain the knowledge units and the non-knowledge units in the original text. The knowledge unit-level disorder processing is performed on the knowledge units and the non-knowledge units in the original text to obtain the disorder text. The character attribute of each character in the disorder text is generated. The character attribute includes the original position of the character in the original text and the present position of the character. The training text set is generated based on the character attribute of each character in the disorder text. The initial semantic representation model is trained by employing the training text set to generate the semantic representation model. With the method, the original text is recognized and segmented, the disorder processing is performed on the segmented original text to obtain the disorder text, and the initial semantic model is trained based on the character attributes in the disorder text. In this way, the words and the entities of the original text may be modeled by employing the hierarchical disorder modeling method for the knowledge units, such that the model may learn the knowledge of the real world, and the effect of the model is enhanced. Meanwhile, the one-way modeling method determined by the character attributes eliminates the deviation between the pre-training and the fine-tuning.

Figure 6:
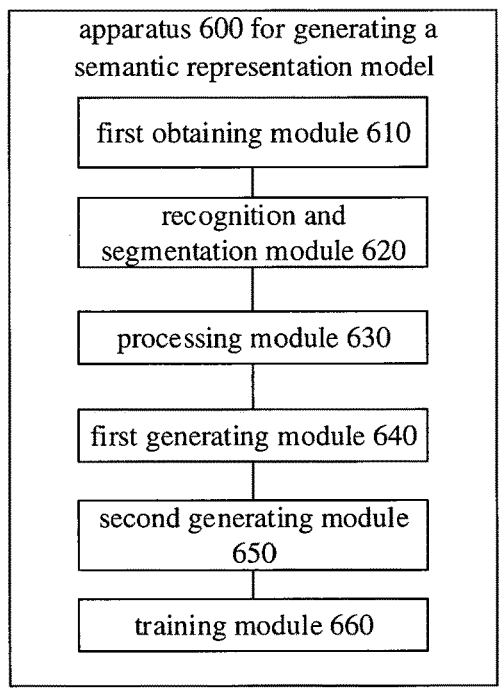
FIG. 6 is a block diagram according to Embodiment four of the disclosure.

FIG. 6 is a block diagram according to Embodiment four of the disclosure. As illustrated in FIG. 6, the apparatus 600 for generating the semantic representation model includes: a first obtaining module 610, a recognition and segmentation module 620, a processing module 630, a first generating module 640, a second generating module 650, and a training module 660.

The first obtaining module 610 is configured to obtain an original text set including original texts. The recognition and segmentation module 620 is configured to perform recognition and segmentation on the original text to obtain knowledge units and non-knowledge units in the original text. The processing module 630 is configured to perform knowledge unit-level disorder processing on the knowledge units and the non-knowledge units in the original text to obtain a disorder text. The first generating module 640 is configured to generate a character attribute of each character in the disorder text. The character attribute includes an original position of the character in the original text and a current position of the character. The second generating module 650 is configured to generate a training text set based on the character attribute of each character in the disorder text. The training module 660 is configured to train an initial semantic representation model by employing the training text set to generate the semantic representation model.

As a possible implementation of embodiments of the disclosure, the recognition and segmentation module 620 is configured to: perform first-level recognition and segmentation on the original text to obtain first-level knowledge units and first-level non-knowledge units; and perform second-level recognition and segmentation on the first-level knowledge units to obtain second-level knowledge units and second-level non-knowledge units.

As a possible implementation of embodiments of the disclosure, the first level is a sentence level, and the second level is a word level.

As a possible implementation of embodiments of the disclosure, the training module 660 is configured to: obtain a present character of the disorder text in the training text set; determine a first character based on the character attribute of each character in the disorder text, the first character being a character at each position in front of the current present of the present character in the disorder text; input the first character, a character attribute of the first character and the character attribute of the present character into the semantic representation model to obtain a character prediction result of the semantic representation model for the present position of the current character; and calculate a loss function value and adjusting a coefficient of the semantic representation model based on the current character and the character prediction result, to generate the semantic representation model.

As a possible implementation of embodiments of the disclosure, the processing module 630 is also configured to: perform character-level disorder processing on multiple characters included in the knowledge units.

Figure 7:
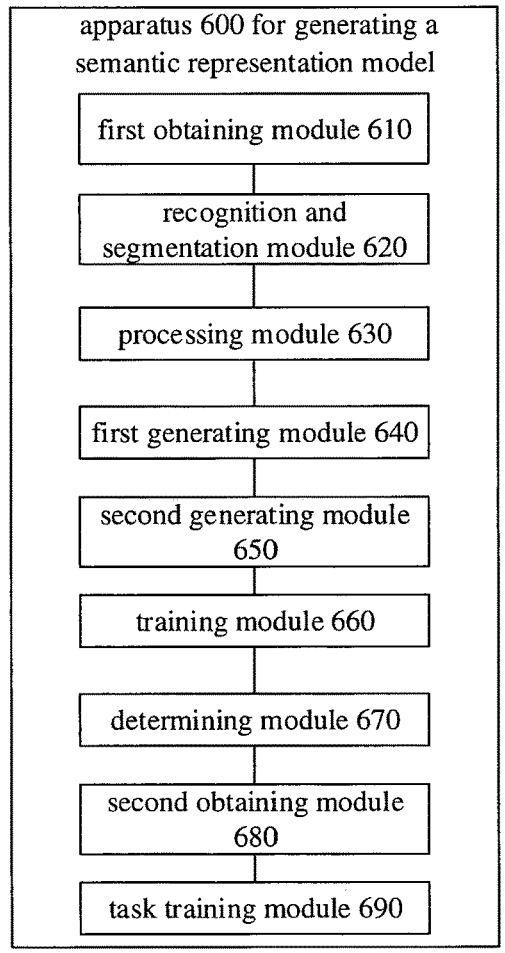
FIG. 7 is a block diagram according to Embodiment five of the disclosure.

As a possible implementation of embodiments of the disclosure, as illustrated in FIG. 7, on the basis of FIG. 6, the apparatus 600 for generating the semantic representation model also includes: a determining module 670, a second obtaining module 680, and a task training module 690.

The determining module 670 is configured to determine a task scene of the semantic representation model. The second obtaining module 680 is configured to obtain training data in the task scene, the training data comprising a training text and a task target. The task training module 690 is configured to train the semantic representation model by employing the training text and the task target to generate the semantic representation model in the task scene.

With the apparatus for generating the semantic representation model according to embodiments of the disclosure, the original text set is obtained. The original text set includes the original texts. The recognition and the segmentation are performed on the original text to obtain the knowledge units and the non-knowledge units in the original text. The knowledge unit-level disorder processing is performed on the knowledge units and the non-knowledge units in the original text to obtain the disorder text. The character attribute of each character in the disorder text is generated. The character attribute includes the original position of the character in the original text and the present position of the character. The training text set is generated based on the character attribute of each character in the disorder text. The initial semantic representation model is trained by employing the training text set to generate the semantic representation model. With the apparatus, the original text is recognized and segmented, the disorder processing is performed on the segmented original text to obtain the disorder text, and the initial semantic model is trained based on the character attributes in the disorder text. In this way, the words and the entities of the original text may be modeled by employing the hierarchical disorder modeling method for the knowledge units, such that the model may learn the knowledge of the real world, and the effect of the model is enhanced. Meanwhile, the one-way modeling method determined by the character attributes eliminates the deviation between pre-training and fine-tuning.

According to embodiments of the disclosure, the disclosure also provides an electronic device and a readable storage medium.

Figure 8:
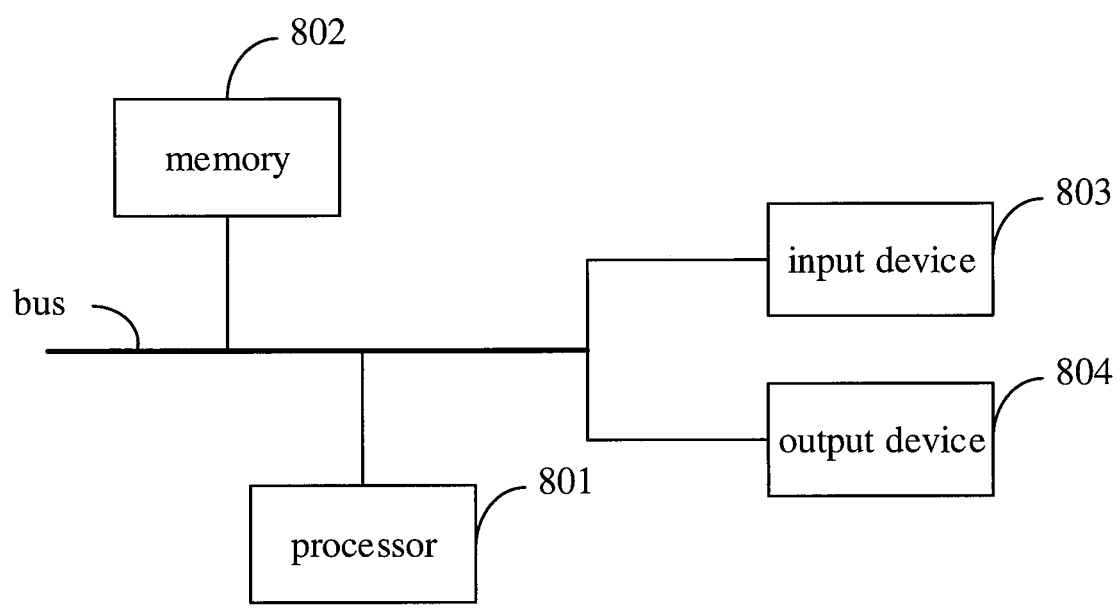
FIG. 8 is a block diagram illustrating an electronic device capable of implementing a method for generating a semantic representation model according to embodiments of the disclosure.

As illustrated in FIG. 8, FIG. 8 is a block diagram illustrating an electronic device capable of implementing a method for generating a semantic representation model according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 8, the electronic device includes: one or more processors 801, a memory 802, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 6, a processor 801 is taken as an example.

The memory 802 is a non-transitory computer readable storage medium provided by the disclosure. The memory is configured to store instructions executable by at least one processor, to enable the at least one processor to execute the method for generating the semantic representation model provided by the disclosure. The non-transitory computer readable storage medium provided by the disclosure is configured to store computer instructions. The computer instructions are configured to enable a computer to execute the method for generating the semantic representation model provided by the disclosure.

As the non-transitory computer readable storage medium, the memory 802 may be configured to store non-transitory software programs, non-transitory computer executable programs and modules, such as program instructions/module (such as the first obtaining module 610, the recognition and segmentation module 620, the processing module 630, the first generating module 640, the second generating module 650, and the training module 660 illustrated in FIG. 6) corresponding to the method for generating the semantic representation model according to embodiments of the disclosure. The processor 801 is configured to execute various functional applications and data processing of the server by operating non-transitory software programs, instructions and modules stored in the memory 802, that is, implements the method for generating the semantic representation model according to the above method embodiments.

The memory 802 may include a storage program region and a storage data region. The storage program region may store an application required by an operating system and at least one function. The storage data region may store data created according to predicted usage of the electronic device based on the semantic representation. In addition, the memory 802 may include a high-speed random access memory, and may also include a non-transitory memory, such as at least one disk memory device, a flash memory device, or other non-transitory solid-state memory device. In some embodiments, the memory 802 may optionally include memories remotely located to the processor 801, and these remote memories may be connected to the electronic device via a network. Examples of the above network include, but are not limited to, an Internet, an intranet, a local area network, a mobile communication network and combinations thereof.

The electronic device capable of implementing the method for generating the semantic representation model may also include: an input device 803 and an output device 804. The processor 801, the memory 802, the input device 803, and the output device 804 may be connected via a bus or in other means. In FIG. 8, the bus is taken as an example.

The input device 803 may receive inputted digital or character information, and generate key signal input related to user setting and function control of the electronic device capable of implementing the method for generating the semantic representation model, such as a touch screen, a keypad, a mouse, a track pad, a touch pad, an indicator stick, one or more mouse buttons, a trackball, a joystick and other input device. The output device 804 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network.

A relationship between the client and the server is generated by computer programs operated on a corresponding computer and having a client-server relationship with each other.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for generating a semantic representation model, comprising:
   obtaining an original text set comprising original texts;
   performing recognition and segmentation on the original text to obtain knowledge units and non-knowledge units in the original text;
   performing knowledge unit-level disorder processing on the knowledge units and the non-knowledge units in the original text to obtain a disorder text;
   generating a character attribute of each character in the disorder text, the character attribute comprising an original position of the character in the original text and a current position of the character;
   generating a training text set based on the character attribute of each character in the disorder text; and
   training an initial semantic representation model by employing the training text set to generate the semantic representation model;
   wherein training the initial semantic representation model by employing the training text set comprises:
   obtaining a present character of the disorder text in the training text set;
   determining a first character based on the character attribute of each character in the disorder text, the first character being a character at each position in front of the present position of the present character in the disorder text;
   inputting the first character, a character attribute of the first character and the character attribute of the present character into the semantic representation model to obtain a character prediction result of the semantic representation model for the current position of the present character; and
   calculating a loss function value and adjusting a coefficient of the semantic representation model based on the current character and the character prediction result, to generate the semantic representation model.

2. The method of claim 1, wherein performing the recognition and segmentation on the original text comprises:
   performing first-level recognition and segmentation on the original text to obtain first-level knowledge units and first-level non-knowledge units; and
   performing second-level recognition and segmentation on the first-level knowledge units to obtain second-level knowledge units and second-level non-knowledge units.

3. The method of claim 2, wherein the first level is a sentence level, and the second level is a word level.

4. The method of claim 1, after performing the knowledge unit-level disorder processing on the knowledge units and the non-knowledge units in the original text to obtain the disorder text, further comprising:
   performing character-level disorder processing on a plurality of characters comprised in the knowledge units.

5. The method of claim 1, after training the initial semantic representation model by employing the training text set to generate the semantic representation model, further comprising:
   determining a task scene of the semantic representation model;
   obtaining training data in the task scene, the training data comprising a training text and a task target; and
   training the semantic representation model by employing the training text and the task target to generate the semantic representation model in the task scene.

6. An apparatus for generating a semantic representation model, comprising:
   one or more processors;
   a memory storing instructions executable by the one or more processors;
   wherein the one or more processors are configured to:
   obtain an original text set comprising original texts;
   perform recognition and segmentation on the original text to obtain knowledge units and non-knowledge units in the original text;
   perform knowledge unit-level disorder processing on the knowledge units and the non-knowledge units in the original text to obtain a disorder text;
   generate a character attribute of each character in the disorder text, the character attribute comprising an original position of the character in the original text and a current position of the character;
   generate a training text set based on the character attribute of each character in the disorder text; and
   train an initial semantic representation model by employing the training text set to generate the semantic representation model;
   wherein the one or more processors are configured to:
   obtain a present character of the disorder text in the training text set;
   determine a first character based on the character attribute of each character in the disorder text, the first character being a character at each position in front of the current present of the present character in the disorder text;
   input the first character, a character attribute of the first character and the character attribute of the present character into the semantic representation model to obtain a character prediction result of the semantic representation model for the present position of the current character; and
   calculate a loss function value and adjusting a coefficient of the semantic representation model based on the current character and the character prediction result, to generate the semantic representation model.

7. The apparatus of claim 6, wherein the one or more processors are configured to:
   perform first-level recognition and segmentation on the original text to obtain first-level knowledge units and first-level non-knowledge units; and
   perform second-level recognition and segmentation on the first-level knowledge units to obtain second-level knowledge units and second-level non-knowledge units.

8. The apparatus of claim 7, wherein the first level is a sentence level, and the second level is a word level.

9. The apparatus of claim 6, wherein the one or more processors are configured to:
perform character-level disorder processing on a plurality of characters comprised in the knowledge units.

10. The apparatus of claim 6, wherein the one or more processors are configured to:
determine a task scene of the semantic representation model;
obtain training data in the task scene, the training data comprising a training text and a task target; and
train the semantic representation model by employing the training text and the task target to generate the semantic representation model in the task scene.

11. A non-transitory computer readable storage medium having computer instructions stored thereon, wherein the computer instructions are configured to cause a computer to execute a method for generating a semantic representation model, and the method comprises:
obtaining an original text set comprising original texts;
performing recognition and segmentation on the original text to obtain knowledge units and non-knowledge units in the original text;
performing knowledge unit-level disorder processing on the knowledge units and the non-knowledge units in the original text to obtain a disorder text;
generating a character attribute of each character in the disorder text, the character attribute comprising an original position of the character in the original text and a current position of the character;
generating a training text set based on the character attribute of each character in the disorder text; and
training an initial semantic representation model by employing the training text set to generate the semantic representation model;
wherein training the initial semantic representation model by employing the training text set comprises:
obtaining a present character of the disorder text in the training text set;
determining a first character based on the character attribute of each character in the disorder text, the first character being a character at each position in front of the present position of the present character in the disorder text;
inputting the first character, a character attribute of the first character and the character attribute of the present character into the semantic representation model to obtain a character prediction result of the semantic representation model for the current position of the present character; and
calculating a loss function value and adjusting a coefficient of the semantic representation model based on the current character and the character prediction result, to generate the semantic representation model.

* * * * *